United States Patent [19]
Gallagher

[11] 4,266,814
[45] May 12, 1981

[54] PLASTIC TUBE ADAPTER

[75] Inventor: Stephen F. Gallagher, Norton, Mass.

[73] Assignee: VFP Corporation, Hingham, Mass.

[21] Appl. No.: 23,072

[22] Filed: Mar. 23, 1979

[51] Int. Cl.³ .............................................. F16L 39/00
[52] U.S. Cl. ................................... 285/319; 285/423; 285/DIG. 22
[58] Field of Search ................ 285/319, DIG. 22, 38, 285/238, 260, 423

[56] References Cited
U.S. PATENT DOCUMENTS

| 921,691 | 5/1909 | Friday | 285/DIG. 22 |
| 1,817,776 | 8/1931 | Sipe | 285/340 |
| 3,249,373 | 5/1966 | Goldstein | 285/423 X |
| 3,686,896 | 8/1972 | Rutter | 285/319 |
| 3,711,125 | 1/1973 | Dehar | 285/319 |
| 3,971,577 | 7/1976 | Schemith | 285/238 |
| 4,022,499 | 5/1977 | Holmes et al. | 285/340 X |

FOREIGN PATENT DOCUMENTS

| 705031 | 3/1965 | Canada | 285/238 |
| 2611233 | 9/1977 | Fed. Rep. of Germany | 285/319 |

*Primary Examiner*—Dave W. Arola
*Attorney, Agent, or Firm*—Russell & Nields

[57] ABSTRACT

A fitting for receiving and locking a plastic tubing in place within it including a hollow tubular member having both compression and flexible locking barbs therein.

3 Claims, 6 Drawing Figures

PLASTIC TUBE ADAPTER

BACKGROUND OF THE INVENTION

This invention relates to a fitting which is adapted to receive the end of plastic tubing and to hold the tubing firmly in place despite forces which might be encountered in use tending to separate the tubing from the fitting. The fitting, in turn, is adapted to be inserted into the locked in place in a female connector. The connector is adapted to form a sealing contact with the end of the plastic tubing. One of the problems which has arisen in the past is that any given fitting operated successfully with plastic tubing only within a limited degree of hardness. Tubing with of a hardness outside of such limited value was too easily pulled out of locked engagement with the fitting. Therefore, one of the principal objects of this invention is to devise a fitting which will receive and firmly retain tubing throughout a relatively broad range of hardness.

SUMMARY OF THE INVENTION

The invention consists of constructing the fitting of a relatively massive length of a stiff hollow tube which comprises a beam section. The tube is provided interiorally with a plurality of locking barbs each of which terminates in a relatively sharp corner adapted to engage and lock inserted tubing in place. One set of barbs constitutes compression barbs. Each compression barb is relatively thick so that it does not undergo substantially transverse flexing under the pressure of tubing being inserted into the fitting. Rather, each compression barb transmits a transverse deflection to the beam section under the pressure of the inserted tubing and the beam exercises a corresponding clamping action on the tubing. Each locking barb is longer and much thinner than the compression barbs so that the locking barb does flex under the transverse motion of the tubing being inserted, the locking barb therefore tends to bind back into the surface of the tubing when such motion stops or is reversed and thus digs into the tubing to lock it in place. The result is that the fitting is adapted successfully to lock tubings of a wide variety of hardness into place in the fitting.

DETAILED DESCRIPTION OF THE PREFERRED EMBODIMENT

Figure 1:
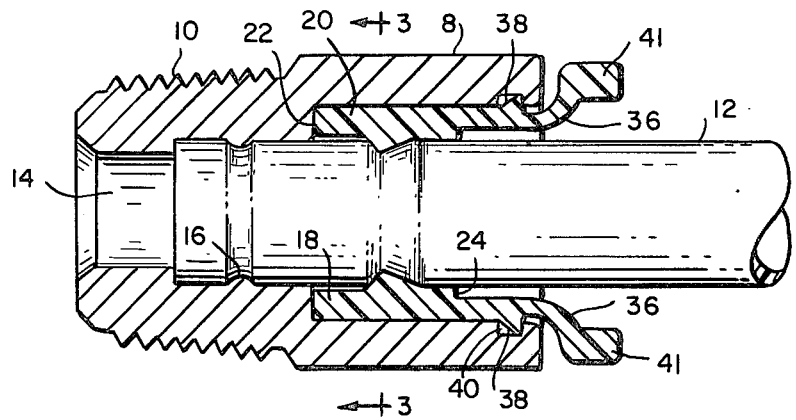
FIG. 1 is a transverse cross-sectional view of a preferred embodiment of the invention taken along line 1—1 of FIG. 2.
Figure 2:
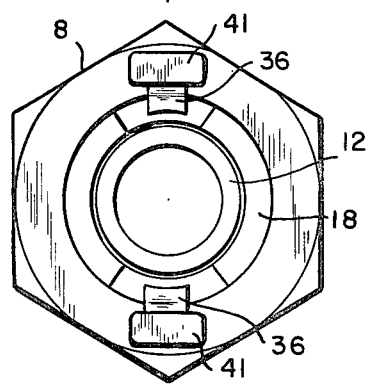
FIG. 2 is an end view of the embodiment as seen from the right hand end of FIG. 1.

In the drawings, 8 is a tubular connector externally threaded at 10 so that it may be secured in the wall of a body to which it is desired to make a fluid-tight connection with a plastic tubing 12. Connector 8 comprises a female member having a central bore 14, into which the tubing 12 is received. The inside wall of bore 14 is provided with an annular bead 16 which is adapted to form a fluid tight seal with the outer wall of tubing 12.

Figure 3:
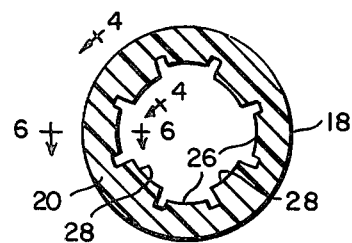
FIG. 3 is a cross-section of the fitting itself taken along line 3—3 of FIG. 1.

In order to lock tubing 12 firmly in place within connector 8, there is provided a novel fitting 18 comprising a molded hollow tubular body formed with a relatively massive "beam" section 20 between its outer end 22 and a point 24. As shown in FIG. 3, the beam section 20 of fitting 18 is provided with a plurality of comparatively short compression barbs 26 and a plurality of comparatively longer locking barbs 28 intermediate the compression barbs 26.

Figure 6:
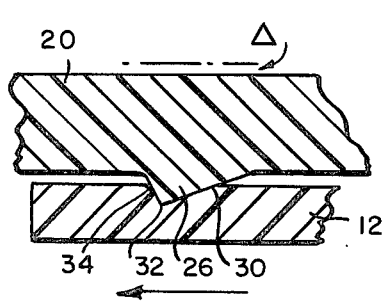
FIG. 6 is a fragmentary large scale cross-section taken along line 6—6 of FIG. 3, illustrating the action of one of the compression barbs of the fitting.

The construction and the action of the compression barb 26 may be seen more clearly in FIG. 6. The barb 26 is wedge shaped with a leading surface 30 at a low angle with the inner wall of beam section 20 of less than about twenty degrees, preferably about fourteen degrees. This low angle causes the surface 30 to act as a camming surface along which the leading edge of tubing 12 is pressed as the tubing is inserted into fitting 18. Particularly if the tubing is quite hard, the tubing will exert a large component of its pushing force outwardly against the beam section 20 causing it to deflect outwardly by a small increment. As a result, the beam section exerts a strong compression force through the compression barb 26 upon the outerwall of the tubing 12. The harder the tubing, the greater will be this compression force. Such force, of course exerts its greatest effect upon tubing 12 at the apex 32 of the wedge shaped barb 26. In order to maximize such force, apex 32 is located substantially at the midpoint of beam section 20.

The trailing surface 34 of barb 26 forms a much sharper angle with the inner wall of beam section 20 and is preferably disposed at about ninety degrees with respect to leading surface 30. As a result, when a force is exerted upon tubing 12 tending to pull it out of fitting 18, only a small component of that force will be exerted through trailing surface 34 outwardly against beam section 20. This small component will be insufficient to overcome the strong compressional force exerted by beam section 20 against barb 26. Therefore, such compressional force will keep tubing 12 locked firmly in place.

Figure 4:
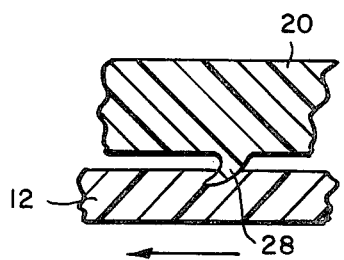
FIG. 4 is a fragmentary large scale, cross-section taken along line 4—4 of FIG. 3, showing the position of one of the locking barbs of the fitting as the tubing is being inserted.
Figure 5:
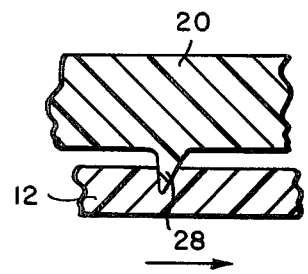
FIG. 5 is a view, similar to FIG. 4, showing the position of the locking barb when an attempt is made to remove the tubing from the fitting.

However, if the tubing 12 is sufficiently soft, it may tend to flow around the compression barbs 26 and thus be released from the locking action of such compression barbs. The present invention overcomes this difficulty by means of locking barbs 28. Each locking barb is not only longer than compression barbs 26 but is also thinner. As shown more clearly in FIGS. 4 and 5, each locking barb 28 is preferably formed with an angular width of less than twenty degrees, preferably about twelve degrees. The section 20 is formed with the axis of each barb 28 inclined toward the left hand end of said section preferably of the order of sixty degrees or less, preferably about forty degrees. As a result of its length and thinness, each locking barb is sufficiently flexible to flex under the pressure exerted by tubing 12 soft enough to flow around compression barbs 26. As shown in FIG. 4, when tubing 12 is inserted into fitting 18 within beam section 20, along the direction of the arrow in FIG. 4, locking barb 28 will flex with its apex pointing in the direction of such travel. When, however, a force is exerted on tubing 12 tending to pull it out of fitting 18, as shown in FIG. 5, the apex of locking barb 28 will dig into the surface of tubing 12 and will tend to straighten barb 18. Thus the greater the pull on tubing 12, the greater will be the extent to which locking barb 28 digs into tubing 12. Thus such softer tubing will be locked firmly in place as well as the harder tubings, as described above. The fact that each barb 28 is longer than the barbs 26 insures that despite any constricting deformation of tubing 12 by barbs 26, the end of each barb 28 will project into the path of tubing 12 sufficiently to be engaged and flexed by tubing 12.

A pair of resilient latching arms 36 extends from the inner end of beam section 20. Each arm 36 carries a latching detent 38 which is adapted to snap into a detent groove 40 formed in the right hand end of connector 8. As fitting 18, carrying tubing 12, is inserted into connector 8, detents 38 will engage grooves 40 and lock the assembly of fitting 18 and tubing 12 into the connector 8. Each arm 36 extends beyond its detent 38 and terminates in a release button 41. Thus the fitting 18 may be released by manually depressing the release buttons 41.

It is to be understood that the drawings are not necessarily to scale so that variations may be made in the sizes and relationships of the various portions of the device and that various other modifications may be made within the preferred embodiment as described above within the scope of the invention as defined in the appended claims.

What is claimed is:

1. A hollow fitting containing compression barbs and separate locking barbs for receiving and locking any tubing, throughout a broad range of hardness, in place within said fitting, the upper portion of said range being characterized by materials which do not flow around said compression barbs and are not readily penetrated by said locking barbs, the lower portion of said range being characterized by materials which do flow around said compression barbs and are readily penetrated by said locking barbs, said fitting comprising:
   (a) an elongated hollow tubular member constituting a beam section; said tubular member being defined by circumferentially continuous inner and outer walls;
   (b) a plurality of compression barbs and a plurality of locking barbs projecting from the inner wall of said member and disposed around its circumference;
   (c) said compression barbs and locking barb being located at substantially the midpoint of the length of said beam section, said compression barbs being so substantially thicker than said locking barbs that said compression barbs are capable of transmitting a strong compression force upon the wall of any of said tubing, within said upper portion of said hardness range, to hold said tubing in place;
   (d) said locking barbs being longer than said compression barbs and so substantially thinner than said compression barbs that said locking barbs are capable of flexing in one direction under the longitudinal motion of tubing moving into said member and of flexing in the opposite direction and digging into the surface of any of said tubing, within said lower portion of said hardness range, upon any reverse motion to retain said tubing in place.

2. A fitting as in claim 1 in which each of said locking barbs project from said inner wall with an angular width of less than about 20 degrees.

3. A fitting as in claim 2 in which the axis of each of said locking barbs is inclined in the direction of insertion of said tubing at an angle with respect to the axis of said fitting.

* * * * *